(12) United States Patent
Giatti et al.

(10) Patent No.: US 12,146,431 B2
(45) Date of Patent: Nov. 19, 2024

(54) NON-INTRUSIVE REDUCTANT INJECTOR CLOGGING DETECTION

(71) Applicant: VOLVO TRUCK CORPORATION, Gothenburg (SE)

(72) Inventors: Samuel Giatti, Gothenburg (SE); Davide Rizzi, Spekeröd (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 86 days.

(21) Appl. No.: 18/052,315

(22) Filed: Nov. 3, 2022

(65) Prior Publication Data

US 2023/0147578 A1  May 11, 2023

(30) Foreign Application Priority Data

Nov. 11, 2021 (EP) ...................................... 21207745

(51) Int. Cl.
*F01N 3/20* (2006.01)
*G06F 11/14* (2006.01)

(52) U.S. Cl.
CPC ........... *F01N 3/208* (2013.01); *F01N 3/2066* (2013.01); *F01N 2610/02* (2013.01); *F01N 2900/0402* (2013.01); *F01N 2900/1812* (2013.01); *F01N 2900/1821* (2013.01); *F01N 2900/1822* (2013.01); *G06F 11/1476* (2013.01)

(58) Field of Classification Search
CPC .... F01N 3/208; F01N 3/2066; F01N 2610/02; F01N 2900/0402; F01N 2900/1812; F01N 2900/1821; F01N 2900/1822; G06F 11/1476
See application file for complete search history.

(56) References Cited

U.S. PATENT DOCUMENTS

| | | | |
|---|---|---|---|
| 2011/0107742 A1 | 5/2011 | Igarashi et al. | |
| 2013/0283771 A1* | 10/2013 | Nagata ...................... | F01N 3/08 60/282 |
| 2018/0128142 A1* | 5/2018 | Collins .................... | F01N 9/00 |
| 2019/0063296 A1 | 2/2019 | Cole et al. | |
| 2020/0072113 A1 | 3/2020 | Sykes et al. | |
| 2022/0065185 A1* | 3/2022 | Nair ..................... | F02D 41/2467 |

FOREIGN PATENT DOCUMENTS

| | | |
|---|---|---|
| DE | 102015204545 A1 | 9/2016 |
| EP | 2131021 A1 | 12/2009 |
| EP | 3333388 A1 | 6/2018 |
| EP | 3450712 A1 | 3/2019 |

OTHER PUBLICATIONS

Extended European Search Report in corresponding European Application No. 21207745.7 dated Apr. 12, 2022 (8 pages).

* cited by examiner

*Primary Examiner* — Audrey B. Walter
(74) *Attorney, Agent, or Firm* — Venable LLP; Jeffri A. Kaminski

(57) ABSTRACT

A computer-implemented method for determining whether a reductant (e.g. urea) injector is clogged is provided. The method includes receiving data indicative of an injector duty cycle and a pump duty cycle. Using a trained machine learning module, at least a first value is calculated, indicative of a probability of the injector being clogged. The method further includes providing, based on the first value, an indication of whether the reductant injector is clogged. A device for providing the indication using the method, a computer program, a reductant injector system, and e.g. a combustion engine including such a reductant injector system are also provided.

15 Claims, 7 Drawing Sheets

NON-INTRUSIVE REDUCTANT INJECTOR CLOGGING DETECTION

TECHNICAL FIELD

The present disclosure relates to the field of reductant (e.g. urea) injectors used in exhaust systems of combustion engines. In particular, the present disclosure relates to detection of clogging of such reductant injectors.

BACKGROUND

In order to meet emission standards set by local/regional authorities, manufacturers of combustion engines, in particular diesel-driven engines, are required to design their engines and accompanying exhaust systems such that the emission of nitrogen oxides (NOx) during engine use is below a certain maximally allowed level. To achieve such a goal, selective catalytic reduction (SCR) may be used, where a catalyst is used to convert the unwanted NOx-molecules into e.g. diatomic nitrogen ($N_2$) and water ($H_2O$). To provide a reductant for such a process, a popular choice is to provide e.g. urea (also known as carbamide) among the exhaust gases. Due to the high temperature of the exhaust gases, the urea will thermally decompose into ammonia and carbon dioxide ($CO_2$), and the ammonia may then react with the NOx-molecules to achieve the above desired conversion of the NOx-molecules into e.g. hydrogen and water.

To provide the reductant, a reductant dosing system usually includes a reductant injector which creates a spray of reductant (e.g. a mixture of urea and water, also referred to as e.g. Diesel Exhaust Fluid, DEF) into the exhaust system of the engine, upstream of the SCR catalyst. However, due to the chemical characteristics of the reductant, crystals may form around (or inside) the injector and lead to either a partial or complete clogging of the reductant injector. If the reductant injector becomes clogged, the reductant cannot properly be introduced among the exhaust gases, and the desired reduction of NOx-molecules will not be possible. In order to still meet the emission standards while the engine is running, other actions (such as e.g. a forced reduction of engine torque to reduce the production of NOx-molecules upstream of the SCR catalyst) must then be taken, causing an unwanted degradation of the overall experience for e.g. a user of the engine. It is therefore desirable to be able to detect whether a reductant injector is clogged, in order to perform adequate repair or even replacement of the reductant injector as soon as possible.

Currently available solutions for detection of clogging of e.g. urea injectors are, however, often intrusive, and require e.g. to temporarily deviate from and disturb a normal strategy of dosing the urea while the engine is running.

SUMMARY

To at least partially solve the above identified problems with currently available methods for detection of clogging of reductant injectors, the present disclosure provides an improved (computer-implemented) method for determining whether a reductant injector is clogged, an improved device for determining whether a reductant injector is clogged, an improved computer program for determining whether a reductant injector is clogged, an improved reductant injection system for a combustion engine, and an improved combustion engine as defined in the accompanying independent claims. Other aspects also provide an improved exhaust system for a combustion engine, and an improved vehicle. Various alternative embodiments are defined in the dependent claims.

According to a first aspect of the present disclosure, a computer-implemented method for determining whether a reductant injector is clogged is provided. The method includes receiving data. The data is indicative of at least i) an injector duty cycle for the reductant injector, and ii) a pump duty cycle for a pump providing reductant to the reductant injector. The method further includes providing the data as input to a determination module. The determination module implements one or more machine learning algorithms. The one or more machine learning algorithms are trained to, based on the data indicative of the injector duty cycle and the pump duty cycle, infer one or more statistics. The one or more statistics include at least a first value. The first value is indicative of a probability of the reductant injector being clogged. The method further includes providing, based on the one or more statistics (i.e. based at least on the first value), an indication of whether the reductant injector is clogged.

The present disclosure of the method according to the first aspect improves upon existing technology in that the proposed method is passive, in the sense that it does not actively interfere with the normal dosing strategy and commands provided for emission control. In addition, the proposed method can also be run continuously while the engine is running, as it relies on a few signals (i.e. the injector duty cycle and pump duty cycle) which are continuously available, and the enabling conditions required for running the method are thus less stringent. In addition to being able to run continuously along the normal dosing strategy, the proposed method also allows to detect both internal (e.g. around the needle) and external clogging of the reductant injector, as both types of clogging will affect the data provided to the determination module.

As used herein, the term "reductant" is envisaged to include any substance, molecule or mixture thereof in fluid/liquid form which may be sprayed into the exhaust system of a combustion engine in order to reduce the amount of NOx molecules released from the combustion engine into the environment when running. For example, an envisaged reductant is urea, or e.g. a mixture of urea and for example water, such as found in DEF or e.g. AUS 32, and also marketed as for example "AdBlue". It may also be envisaged that the reductant injected using the reductant injector is for example ammonia, or similar.

In one or more embodiments of the method, the determination module may be at least partially implemented using an artificial neural network (ANN). The ANN may include at least an input layer, a hidden layer connected to the input layer, and an output layer connected to the hidden layer. The hidden layer or the output layer may include at least one neuron for providing the first value.

In one or more embodiments of the method, the input layer may include at least 2N input neurons. A first set of N input neurons may be configured to receive values indicative of the injector duty cycle sampled across a first time window of N different first time indices. A second set of N input neurons may be configured to receive values indicative of the pump duty cycle sampled across a second time window of N different second time instances.

In one or more embodiments of the method, the first time window may equal the second time window. All of the first time instances and the second time instances may be separated by a same time difference.

In one or more embodiments of the method, providing an indication that the reductant injector is clogged may include confirming a fulfillment of a full set of one or more conditions. The one or more conditions may include a first condition. The first condition may be that for at least one time instance, the first value, or a value of a first function applied to the first value, is at least not below a first threshold. Herein, that a particular value is "at least not below a particular threshold" can be verified by confirming that the particular value is above the particular threshold, and/or by verifying that the particular value equals the particular threshold.

In one or more embodiments of the method, the first function may include applying a low-pass filtering to the first value. This may help to filter out eventual noise present in the input data, before such noise gets the opportunity to influence the decision performed by the method.

In one or more embodiments of the method, the first condition may further include that, for each of a first plurality of subsequent time instances, the first value, or the value of the first function applied to the first value, equals or exceeds the first threshold.

In one or more embodiments of the method, the one or more statistics may further include a second value. The second value may be indicative of a probability of the reductant injector not being clogged. The one or more conditions may further include a second condition that, for the at least one time instance, the second value, or a value of a second function applied to the second value, is at least not above a second threshold.

In one or more embodiments of the method, the second function may include applying a low-pass filtering to the second value. Filtering of the second value may, just as for the first value, make the decision of the method less dependent on eventual noise in the input data signals.

In one or more embodiments of the method, the second condition may further include that, for each of a second plurality of subsequent time instances, the second value, or the value of the second function applied to the second value, equals or exceeds the second threshold.

In one or more embodiments of the method, the one or more conditions may further include a third condition that, during at least a first time period preceding and optionally also including the at least one time instance, a requested mass flow, and/or a time average of a requested mass flow, for the reductant injector has at least not been below a mass flow threshold.

In one or more embodiments of the method, the one or more conditions may further include a fourth condition that, during at least a second time period preceding and optionally also including the at least one time instance, a count of time instances at which all of the other of the one or more conditions have been fulfilled is at least not below a first voting threshold. The second time period may in some embodiments at most extend back to a time instance at which the fourth condition was last fulfilled.

In one or more embodiments of the method, the second time period may at most extend back to a most recent of the time instance at which the fourth condition was last fulfilled and a time instance at which a count of time instances at which all of the other of the one or more conditions have not been fulfilled was last at least not below a second voting threshold.

In one or more embodiments of the method, the one or more conditions may further include a fifth condition that a (second) count that is increased at each time instance at which all of the other of the one or more conditions have been fulfilled, and decreased at each time instance at which all of the other of the one or more conditions have not been fulfilled, is at least not below a third voting threshold.

In one or more embodiments of the method, the one or more statistics may further include at least one additional value indicative of a probability of the reductant injector being only partially clogged.

According to a second aspect of the present disclosure, a device for determining whether a reductant injector is clogged is provided. The device includes processing circuitry. The processing circuitry is configured to cause the device to receive data indicative of at least i) an injector duty cycle for the reductant injector and ii) a pump duty cycle for a pump providing reductant to the reductant injector. The processing circuitry is further configured to generate an indication of whether the reductant injector is clogged by performing a method according to the first aspect. The processing circuitry is also configured to output a signal including the indication.

According to a third aspect of the present disclosure, a computer program for determining whether a reductant injector is clogged is provided. The computer program includes computer code which, when run on processing circuitry of a device, causes the device to receive data indicative of at least i) an injector duty cycle for the reductant injector and ii) a pump duty cycle for a pump providing reductant to the reductant injector. The device is further caused (by the computer code run on the processing circuitry of the device) to generate an indication of whether the reductant injector is clogged by performing a method according to the first aspect, and to output a signal including the indication.

According to a fourth aspect of the present disclosure, a reductant injection system for (an exhaust system for) a combustion engine is provided. The system includes a reductant injector configured to inject reductant into the exhaust system. The system further includes a pump configured to provide reductant to the reductant injector. The system further includes a control unit configured to control an injector duty cycle for the reductant injector and a pump duty cycle for the pump. The system also includes a device for determining whether the reductant injector is clogged according to second aspect.

In one or more embodiments of the reductant injection system, the device may be implemented as part of the control unit, or vice versa.

According to a fifth aspect of the present disclosure, an exhaust system for a combustion engine is provided. The exhaust system includes a reductant injection system according to the fourth aspect.

According to a sixth aspect of the present disclosure, a combustion engine is provided. The combustion engine includes an reductant injection system according to the fourth aspect, and/or an exhaust system according to the fifth aspect.

According to a seventh aspect of the present disclosure, a vehicle is provided. The vehicle includes a combustion engine and an exhaust system according to the fifth aspect.

Other objects and advantages of the present disclosure will be apparent from the following detailed description, the drawings and the claims. Within the scope of the present disclosure, it is envisaged that all features and advantages described with reference to e.g. method of the first aspect are relevant for, apply to, and may be used in combination with also any feature and advantage described with reference to the device of the second aspect, the computer program of the third aspect, the reductant injection system of the fourth aspect, the exhaust system of the fifth aspect, the combustion engine of the sixth aspect, and the vehicle of the seventh aspect, and vice versa.

BRIEF DESCRIPTION OF THE DRAWINGS

Exemplifying embodiments will now be described below with reference to the accompanying drawings, in which.

Figure 1A:
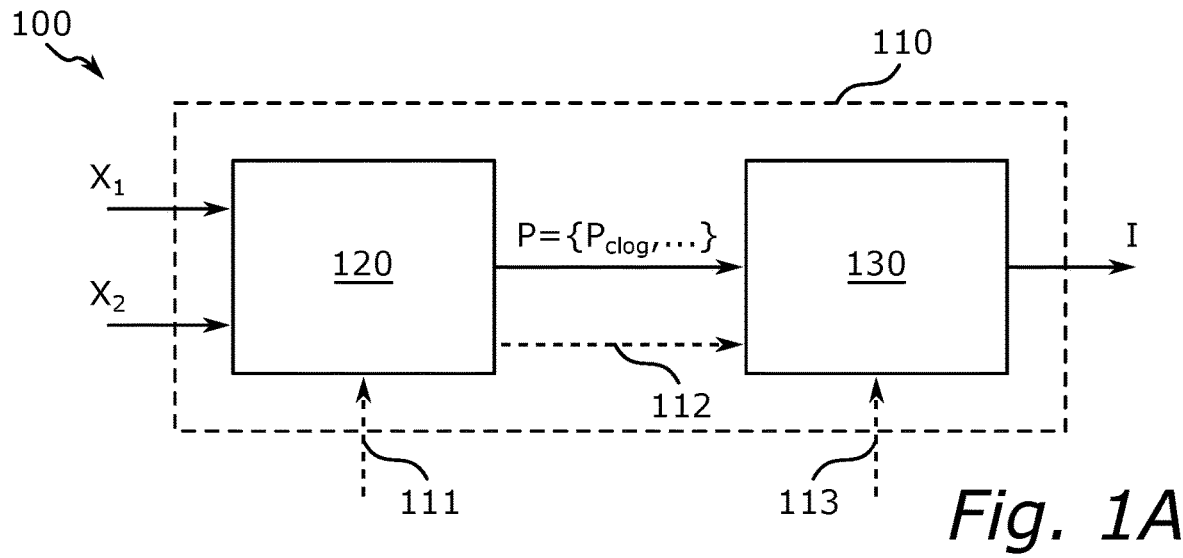
FIGS. 1A-1G schematically illustrate flowcharts of various embodiments of a method according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Exemplifying embodiments of the envisaged method, device, computer program, reductant injection system, exhaust system, combustion engine and vehicle according to the present disclosure will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

As described earlier herein, it is envisaged that a "reductant" may be for example urea (or a mixture of urea and e.g. water). Although it is envisaged also that a reductant may be something else, such as e.g. ammonia, urea will in what follows (for exemplary reasons only) be used as an example of the reductant. For this reason, the terms "reductant" and "urea" will be used interchangeably. Similarly, the terms "reductant/urea injector" and just "injector" will be used interchangeably as well.

FIG. 1A schematically illustrates a flowchart of a computer-implemented method 100 according to one embodiment of the present disclosure. In what will follows, it will be assumed that this and other embodiments will relate to computer-implemented methods only, and that, also in what follows, such a computer-implemented method will be referred to as simply a "method".

The method 100 includes a determination module 110 configured to determine whether a reductant/urea injector is clogged. To do so, the determination module 110 includes a machine learning module 120 that implements one or more machine learning algorithms, and receives as its input at least data indicative of an injector duty cycle $X_1$ for the injector, and data indicative of a pump duty cycle $X_2$ for a pump which provides urea to the injector. There may of course, in this or other embodiments, optionally be other, additional input data in provided to the machine learning module 120 as well. As will be described later herein in more detail, the machine learning module 120 has been trained to infer a set $P=\{P_{clog}, \ldots\}$ of one or more statistics, based on at least the input data $X_1$ and $X_2$ (and in some embodiments also based on the optional input data in). The set P includes at least a first value (or statistic) $P_{clog}$ which is indicative of a probability that the injector is clogged. For example, after proper scaling, the value $P_{clog}$ may assume a decimal value between 0 and 1, where e.g. 0 represents an estimated 0% probability of the injector being clogged, where 0.5 represents an estimated 50% probability of the injector being clogged, and where 1 represents an estimated 100% probability of the injector being clogged. Other scaling of the values of the set P are of course also possible. The machine learning module 120 may of course, in this or in other embodiments, optionally output also additional output data 112.

The output from the machine learning module 110, including at least the set P and optionally also the optional additional output data 112, is provided to a decision module 130 which, based on the set P (including the first value $P_{clog}$) makes a decision whether the injector is clogged or not, and outputs a signal I which is indicative of the made decision. For example, if it is decided by the decision module 130 that the injector is clogged, the signal I may correspond to a logical "1", while, if the decision is that the injector is not clogged, the signal I may instead correspond to a logical "0" or e.g. to an undetermined state. Of course, the exact form of the signal I is not important, as long as the signal I contains enough information in order to infer therefrom the decision made by the decision module 130. The signal I may be an analog signal, a digital signal, or similar. To make its decision, the decision module 130 may also, in this or in other embodiments, optionally receive and use additional input data 113.

The input data $X_1$ and $X_2$ are preferably provided as samples of the true injector duty cycle and pump duty cycle, respectively, taken at discreet time instances $t_i$, where i is an integer corresponding to a particular sample, and such that $X_1(i)=X_1(t=t_i)$ and $X_2(j)=X_2(t=t_j)$. In some embodiments, all time instances are equidistant in time. In other embodiments, it is envisaged that the spacing in time between time instances may be different. The time instances are preferably the same for both the injector and pump duty cycles, but it may also be envisaged that e.g. the data for the injector duty cycle is provided at time instances which are different from those of the pump duty cycle. For example, the time between consequent time instances may be the same for both duty cycles, but the time instances of e.g. the injector duty cycle may lag those of the pump duty cycle by a fixed amount, or vice versa. In other embodiments, it may e.g. be such that one duty cycle is sampled at a higher or lower frequency than the other, etc. In any case, it is envisaged that the machine learning module 120 and the corresponding machine learning algorithm(s) are preferably trained using training data sampled in a same way as the actual, live data on which the method 100 is going to operate.

In what follows, it will be assumed that all signals are sampled at discrete time instances.

The Decision Module 130

Figure 1B:
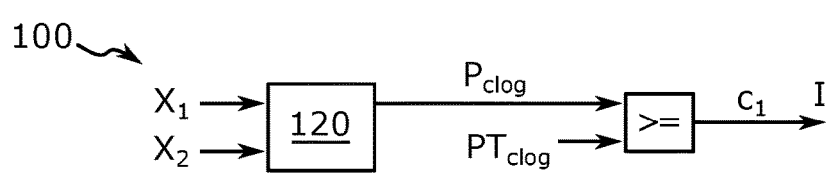

FIG. 1B schematically illustrates a flowchart of one embodiment of the method 100. Here, the decision module 130 shown in FIG. 1A is implemented by checking a first condition $c_1$, which corresponds to the value $P_{clog}$ at least not being lower than a first threshold $PT_{clog}$. If this condition $c_1$ is fulfilled (that is, $P_{clog} \geq PT_{clog}$), then $c_1=1$ (or "true"). Otherwise, $c_1=0$ (or "false"). The indication I equals the value of $c_1$, such that it is indicated that the injector is clogged only $P_{clog} \leq PT_{clog}$. By introducing and comparing against the first threshold $PT_{clog}$, the indication can be made more useful and reliable as it requires the certainty of the probabilistic guess made by the machine learning module 120 to reach some minimum level.

Figure 1C:
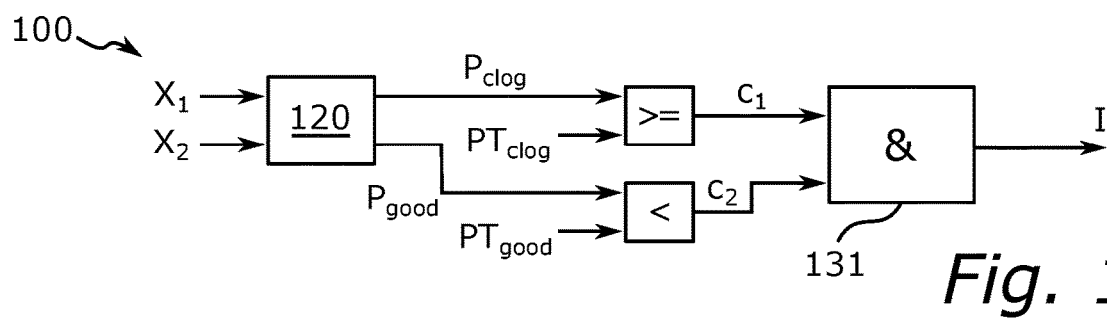

FIG. 1C schematically illustrates a flowchart of a further envisaged development of the method 100 illustrated in FIG. 1B. In FIG. 1C, in addition to $P_{clog}$, the machine learning module 120 also outputs a second value (or statistic) $P_{good}$, which is indicative of an estimated probability that the injector is not clogged. The machine learning module 120 thus works as a classifier, which attempts to classify the state of the injector as either being "clogged" or "not clogged" (or "good"), and which provides estimated probabilities of the injector belonging to either such class. Compared to the method 100 illustrated in FIG. 1B, where only a single class ("clogged") is used, this may enhance the reliability of the output from the machine learning module 120, as it can be further checked whether the estimates are reasonable i.e. by comparing that the machine learning module 120 does not indicate that the injector is likely a member of both classes at the same time. As shown in FIG. 1C, this may be achieved by comparing also the second value $P_{900}$ against a second threshold $PT_{good}$, and to make sure that a second condition $c_2$, corresponding to $P_{good}$ at least not being above the second threshold, needs to be fulfilled before it is determined that the injector is clogged. This is obtained by the use of the confirmation module 131, which considers all the inputs $c_1$ and $c_2$, and which outputs a positive signal (i.e. "clogged") only if both $c_1$ and $c_2$ are true. The confirmation module 131 may for example be in the form of an AND logic gate, i.e. outputting $c_1 \hat{A} c_2$. If the machine learning module 120 provides that $P_{clog}$ is high and $P_{good}$ is low, it may with higher confidence be decided that the injector is in fact clogged (I=1), as it would first be required that both the conditions $P_{clog} \leq PT_{clog}$ and $P_{good} < PT_{good}$ are fulfilled. Likewise, if the output from the machine learning module 120 was that $P_{clog}$ is low and $P_{good}$ is high, it may with higher confidence be decided that the injector is not clogged (I=0), as neither $P_{clog} \geq PT_{clog}$ nor $P_{good} < PT_{good}$ would be fulfilled. However, if the machine learning module 120 was to output that e.g. both $P_{clog}$ and $P_{good}$ are high, the outcome is undecisive, and the use of both the two classes as well as the two thresholds would prevent the output/from being one/true even if $P_{clog} \geq PT_{clog}$ was still fulfilled, as $P_{good} < PT_{good}$ would not be fulfilled at the same time, etc.

Figure 1D:
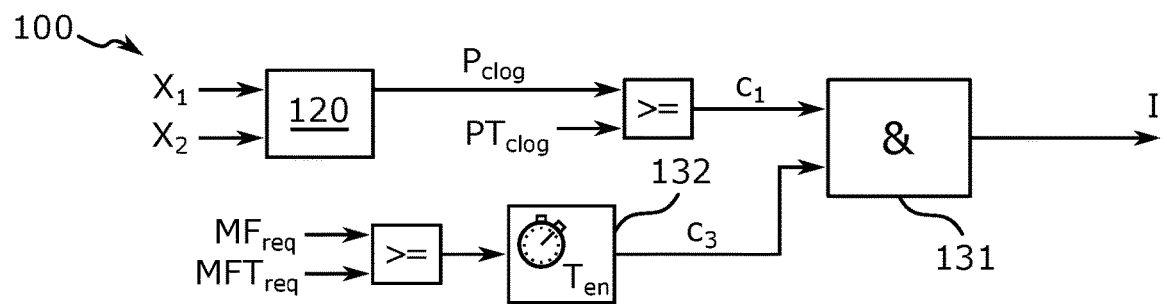
Figure 1E:
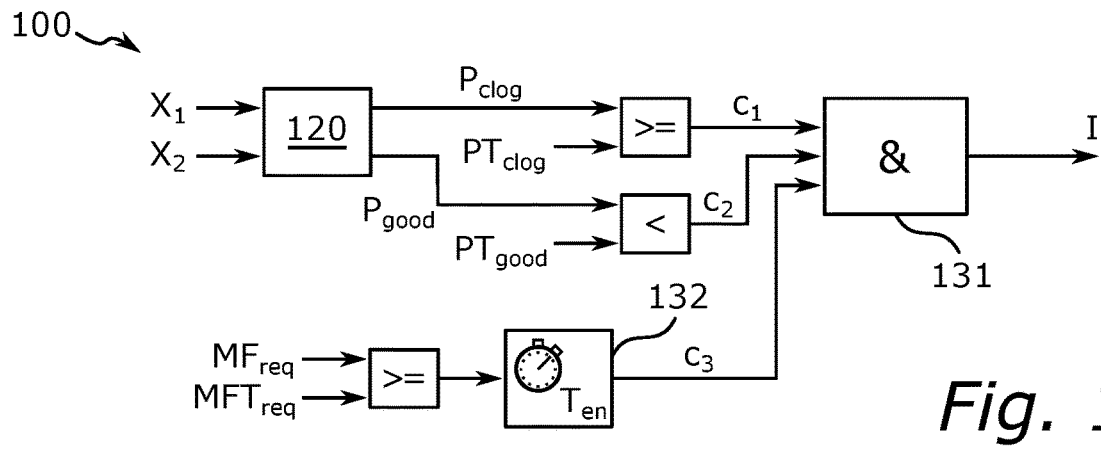

FIGS. 1D and 1E schematically illustrate flowcharts of further envisaged developments of the methods 100 illustrated in FIGS. 1B and 1C.

In FIG. 1D, the machine learning module 120 uses the single class "clogged" just as in FIG. 1B, but the first condition $c_1$ is complemented by an additional third condition $c_3$ that also must be fulfilled before the indication I becomes positive. Both the first condition $c_1$ and the third condition $c_3$ are provided to the confirmation module 131, which outputs a positive indication I only if both $c_1$ and $c_3$ are true (i.e., $I=c_1 \hat{A} c_3$). Here, the third condition $c_3$ is based on additional input data 113 to the decision module 130 in the form of a requested mass flow $MF_{req}$ for the injector (as requested by a control system responsible for the normal operation of the injector, and measured e.g. in grams/second), together with a mass flow threshold $MFT_{req}$. For each time instance, it is checked whether $MFT_{req}$ is at least not below the threshold $MFT_{req}$. A timer module 132 then checks whether if during a first time period $T_{en}$ (which precedes and possibly also includes the current time instance) the value $MF_{req}$ has always been at least below $MFT_{req}$. If the timer module 132 finds out that this is true, its output $c_3$ is true. If at one or more time instances during the interval $T_{en}$ the timer module 132 finds out that $MF_{req}$ has gone below $MFT_{req}$, it instead outputs a negative value of $c_3$. The first time period $T_{en}$ may for example be a rolling time period, including e.g. the current time instance and the $M_1$ previous time instances, or similar. Other embodiments may include e.g. instead checking whether a (rolling) time average of $MF_{req_{avg}}$ (taken over the first time period $T_{en}$), instead of only a single instance of $MF_{req}$, has at least not been below $MFT_{req}$ at any point during $T_{en}$, and to output that $c_3$ is true if this condition is fulfilled, and to otherwise output that $c_3$ is false. To include the history of the requested mass flow to the injector as an additional condition may further help to increase the reliability of the final decision output by the method (i.e. the indication I). For example, if there has been little requested mass flow to the injector during the latest time interval, the opening time (i.e., the duty cycle) of the injector may be so low that it becomes hard to differentiate between the injector being clogged or simply just not being open long enough to cause a noticeable effect on e.g. the pump duty cycle or similar. The threshold $MFT_{req}$ may be selected accordingly, such that a low (or even lack of) requested mass flow during the last time interval can be detected. In one example embodiment, the requested minimum mass flow may e.g. be $MFT_{req}=0.5$ g/s. It is, of course, envisaged that other threshold values may also be used, depending on the exact configuration and dimensioning of e.g. the engine, the exhaust system, the type of reductant used, and so on and so forth. It should also be noted that, herein, a "positive" value (e.g. "1" or "high") of the indication I is considered to correspond to the injector being clogged. It may, of course, also be possible to reconfigure e.g. the decision module 130 such that the indication I is instead "negative" (e.g. "o", or "low") when the injector is clogged. This applies also to e.g. the machine learning module 120, wherein for example a neural network can just as well be trained such that low output values correspond to high probabilities, and vice versa, and where the decision module 130 may be reconfigured to adapt the indication I accordingly. Phrased differently, the important thing is that the indication I somehow changes its value when the injector goes from being non-clogged to clogged, and vice versa, such that such a change can be used to indicate e.g. to an operator, a driver, etc., that the clogging-condition of the injector has changed.

In FIG. 1E, the principle is the same as in FIG. 1D, but also the second class ("not clogged", or "good") is taken into account as explained earlier herein with reference to FIG. 1C. The confirmation module 131 receives all of $c_1$, $c_2$ and $c_3$, and outputs a positive indication 1 only if all of the conditions are true (i.e. $I=c_1\hat{\ }(c_2\hat{\ }c_3)$). Instead of requiring only that $c_1$ and $c_3$ are true before deciding that the injector is clogged, adding the additional condition $c_2$ also can further enhance the reliability of the decision made by the method 100, in particular as it prevents undecisive situations, such as when both $P_{clog}$ and $P_{good}$ are both high, from leading to a decision that the injector is clogged.

In common to all methods 100 illustrated in FIGS. 1B-1E is that the value $P_{clog}$ is always checked against the threshold $PT_{clog}$ (the first condition $c_1$) before a decision is made. This helps to improve reliability by requiring a minimum certainty of the estimates made by the machine learning module 120 before making the decision on I. In the methods 100 illustrated in FIGS. 1C and 1E, a further condition $c_2$ is added in which it is required that the machine learning module 120 first also calculates a probability $P_{good}$ of the injector not being clogged, and that it is made sure that $P_{clog}$ and $P_{good}$ are not high at the same time before deciding that the injector is clogged. Finally, in the methods 100 illustrated in FIGS. 1D and 1E, an additional condition $c_3$ is also added, requiring that in order to decide that the injector is clogged, a requested mass flow (or at least an average of such a requested mass flow) to the injector must have exceeded a certain threshold during a particular time leading up to the current time.

Figure 1F:
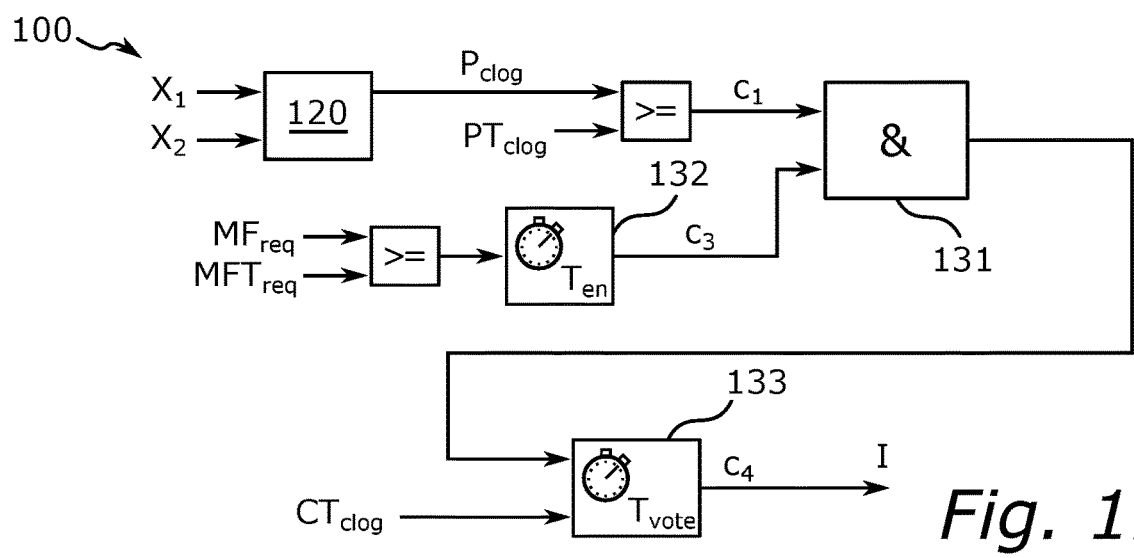
Figure 1G:
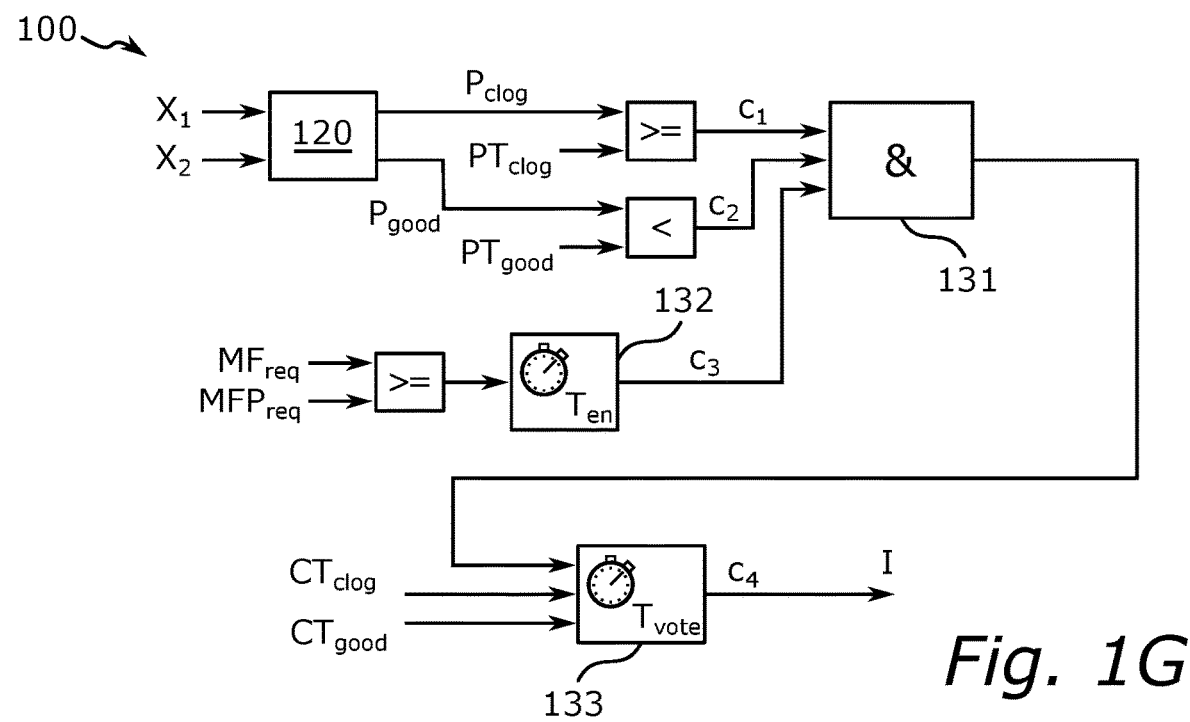

FIGS. 1F and 1G schematically illustrates flowcharts of yet further envisaged developments of the methods 100 of FIGS. 1D and 1F.

In FIG. 1F, the machine learning module 120 uses the single class "clogged", in combination with the requirement for the history of the requested mass flow to the injector. Phrased differently, the above conditions $c_1$, and $c_3$ (but not $c_2$) are both used and checked. In addition, the method 100 illustrated in FIG. 1F also adds a fourth condition $c_4$, which includes a so called "voting condition" that can be explained as follows. During a specific preceding, second time period $T_{vote}$, a voting timer module 133 checks how many times the output from the confirmation module 131 has been positive. That is, the voting timer module 133 keeps a count $C_{clog}$ of the number of preceding time instances, during the second time period $T_{vote}$, at which $sc_1$ and $c_3$ have both been true at the same time. If, during the second time period $T_{vote}$, it is decided that the count $C_{clog}$ is at least not below a first voting threshold $CT_{clog}$ (i.e., it is for example decided that $C_{clog} \geq CT_{clog}$), the output $c_4$ from the voting timer module 133 is set to true. The count $C_{clog}$ can then be reset, and a new second period $T_{vote}$ can be started. Likewise, if the count $C_{clog}$ remains below the first voting threshold $CT_{clog}$ during the whole second time period $T_{vote}$, the output $c_4$ is set to false, and the count $C_{clog}$ is reset and a new second time period $T_{vote}$ starts. After the end of a second time period $T_{vote}$, it may be envisaged e.g. that the condition $c_4$ remains the same as during the previous second time period, before a new decision is taken at the end of the new second time period $T_{vote}$. By restarting the second time period $T_{vote}$ in such a way, it can be ascertained that the second time period $T_{vote}$ does not extend further back in time than to the last time the condition $c_4$ was fulfilled and set to true.

By using the above "voting system", the reliability of the method 100 can be improved in that several equal outputs from the confirmation module 131 are needed during a certain time interval before the state of the method (i.e. the indication I) may change to indicate that the injector is clogged. This prevents e.g. a single erroneous output from the confirmation module 131 to greatly affect the outcome. Likewise, by only waiting for a certain second time period $T_{vote}$ before the voting process starts over, a potential "unclogging" of the detector, occurring at a later time, can also be picked up by the method 100 and the indication I changed accordingly. The indication I is here provided by the confirmation module 131 checking whether all of the conditions $c_1$, $c_3$ and $c_4$ are true, i.e. such that $I=(c_1\char`\^(c_3\char`\^c_4))$.

FIG. 1G illustrates an embodiment of the method 100 in which the machine learning module 120 uses both classes "clogged" and "not clogged" (or "good"). As in FIG. 1F, the voting timer module 133 keeps a count $C_{clog}$ of the number of time instances, during the second time period $T_{vote}$, at which all of the conditions $c_1$, $c_2$ and $c_3$ have been simultaneously true (that is, how many times the output from the confirmation module 131 has been true). In some embodiments, the voting timer module 133 may further behave exactly as in FIG. 1F and output $c_4$ as true if $C_{clog}$ does not stay below $CT_{clog}$ during the whole second time period $T_{vote}$.

However, in some embodiments, the voting timer module 133 may also keep a second count $C_{good}$ of the number of time instances, during the second time period $T_{vote}$, at which the conditions $c_1$, $c_2$ and $c_3$ have failed to be true at the same time (that is, how many times the output from the confirmation module 131 has been false). If it is decided that, during the second time period $T_{vote}$, the second count $C_{good}$ is at least note below a second voting threshold $CT_{good}$, the counters $C_{clog}$ and $C_{good}$ may be reset and a new second time period $T_{vote}$ started. By so doing, this makes it harder for the condition $c_4$ to be fulfilled, as the counter $C_{clog}$ may be reset earlier than it would otherwise have been (i.e. before lapse of the full second time period $T_{vote}$). This may further enhance the reliability of the output from the method 100, as a larger number of occurrences where all conditions $c_1$, $c_2$ and $c_3$ are not simultaneously fulfilled may indicate a higher level of indecisiveness for the method 100. Phrased differently, with the voting system as illustrated in and described with reference to FIG. 1G, there is an ongoing competition between the number $C_{clog}$ of positive outputs from the confirmation module 131 and the number $C_{good}$ of negative outputs from the confirmation module 131, and the number $C_{clog}$ of positive outputs from the confirmation module 131 has to increase quickly enough to reach its threshold $CT_{clog}$ during the second time period $T_{vote}$ in order for it to be decided that the injector is clogged. With the voting system as illustrated in FIG. 1G, the second time period $T_{vote}$ may be set such that it never extends further back in time than to a latest of a last time where $c_4$ was set to true and a last time when the count $C_{good}$ was at least not below the second voting threshold $CT_{good}$.

In another envisaged embodiment of the method 100 as illustrated e.g. in FIG. 1G, the voting timer module 133 may instead work as follows. Instead of having two counts $C_{clog}$ and $C_{good}$, a single count $C_{bucket}$ is used. For each time the output from the confirmation module 131 is positive, the single count $C_{bucket}$ is increased. Likewise, for each time the output from the confirmation module 131 is negative, the single count $C_{bucket}$ is instead decreased. In order for the fourth condition $c_4$ to be true, the single count $C_{bucket}$ must at least not be below a third voting threshold $CT_{bucket}$. Such a condition can instead be considered a fifth condition $c_5$, which can be provided instead of the fourth condition $c_4$. This represents a so-called "leaky-bucket" voting algorithm, where a large sequence of positive outputs from the confirmation module 131 require a large sequence of negative outputs from the confirmation module 131 in order for the fifth (or fourth) condition $c_5$ (or $c_4$) to change from true to false, and vice versa. It may be envisaged that the count $C_{bucket}$ is limited, such that it cannot go below a lower limit (such as $CT_{min}$, e.g. zero), and such that it cannot exceed an upper limit (such as $CT_{max}$). In other embodiments, it may be envisaged that there are no such limits, such that the count $C_{bucket}$ always represents a difference between the number of positive outputs from the confirmation module 131 and the number of negative outputs from the confirmation module 131. With the leaky-bucket algorithm, there may for example not be required to use any specific time periods over which the counting is performed. The voting timer module 133 may then be referred to as just a "voting module" 133, as there are not necessarily any preceding time periods involved over which its result are calculated.

In common to all methods 100 illustrated in FIGS. 1F and 1G is the use of the voting system, with the benefits thereof explained already above. It should be noted that although e.g. FIGS. 1F and 1G both show the inclusion of the requested mass flow history (via the timer module 132), it is envisaged that in some embodiments of the method 100, all things related to the requested mass flow (including using the third condition $c_3$) may be optional, and not form part of the method 100 as illustrated in FIGS. 1F and 1G.

Although not illustrated specifically in any Figure herein, it may also be envisaged that the machine learning module 120 is configured to use more classes than just a single class ("clogged"), or more than just two classes ("clogged" and "not clogged"/"good"). For example, it is envisaged that there may also be a class for the injector being only "partially clogged", with a corresponding value $P_{clog_p}$ provided in the set P of statistics inferred by the machine learning module 120 based on the input data $X_1$ and $X_2$. For example, there may be one class corresponding to an estimate of the injector being "25% clogged", another class for "50% clogged", and yet another class for "75% clogged", etc. Having classes also for "partially clogged" injectors can be beneficial in that it may be used e.g. to control the provision of urea to the injector. For example, if it is determined that the injector is "25% clogged", this may be compensated for by the control system increasing the mass flow rate of urea to the injector, or similar. If having such additional classes, it is of course envisaged that the various conditions that need to be fulfilled changes accordingly.

The Machine Learning Module 120

As envisaged in various embodiments herein, the machine learning module 120 may for example operate not only on the most recent time instance samples of $X_1$ and $X_2$, but also take into account a history of each duty cycle. For example, if using two classes, where $P_1(i)$ indicates the estimated probability of the injector belonging to the first class at time instance i, and where $P_2(i)$ indicates the estimated probability of the injector belonging to the second class at time instance i, the output of the machine learning module 120 can be formulated as follows:

$$[P_1(i), P_2(i)] = F[X_1(i), X_1(i-1), \ldots, X_1(i-L_1); X_2(i), X_2(i-1), \ldots, X_2(i-L_2)], \quad (1)$$

where $L_1$ and $L_2$ are the number of historical time instances taken into account for each of the duty cycles $X_1$ and $X_2$. It may for example be assumed that $L_1 = L_2 = L$, but it may also, as described earlier herein, be assumed that $L_1 \neq L_2$. Thus, the machine learning module 120 may rely also on historical values of the variables $X_1$ and $X_2$, and not only on the most recent available samples of the duty cycles.

If using e.g. only a single class, it may be envisaged that the output from the machine learning module 120 is just $P_1(i)$. If using more than two classes, the output from the machine learning module 120 may instead be $[P_1(i), P_2(i), \ldots, P_Q(i)]$, where Q is an integer indicating the total number of classes used. As used herein, the first class may correspond to the injector being clogged, e.g. such that $P_1(i) = P_{clog}(i)$. Likewise, the second class may correspond to the injector not being clogged, e.g. such that $P_2(i) = P_{good}(i)$. Of course, the exact numbering of the various classes is irrelevant as long as consistency is kept between all performed operations and calculations.

In other embodiments of the machine learning module 120, regression may be used instead of classification. In such a case, there may be no specific classes, but instead a single output P(i) corresponding to an estimated level of clogging of the injector. For example, after suitable scaling, an estimate of P(i)=0.5 may for example correspond to the injector (as estimated by the machine learning module 120) being 50% clogged, while P(i)=0.1 may correspond to the injector being 10% clogged, etc. Such a method may be desirable due to its simplicity and analog nature.

As envisaged herein, the machine learning module 120 may implement any particular type of machine learning algorithm(s), as long as such algorithm(s) can be trained and are suitable to provide either the classification probabilities $P_1(i), P_2(i), \ldots$ or the analog value P(i) as discussed above. Examples of algorithms may for example be Artificial Neural Networks (ANNs) in general, including e.g. Multi-Layer Perceptrons (MLPs), but also other examples from the realm of machine learning techniques, such as for example Support Vector Machines (SVMs), Decision Trees, Random Forests, and Long Short-Term Memory Neural Networks (LSTMs), etc.

Figure 2:
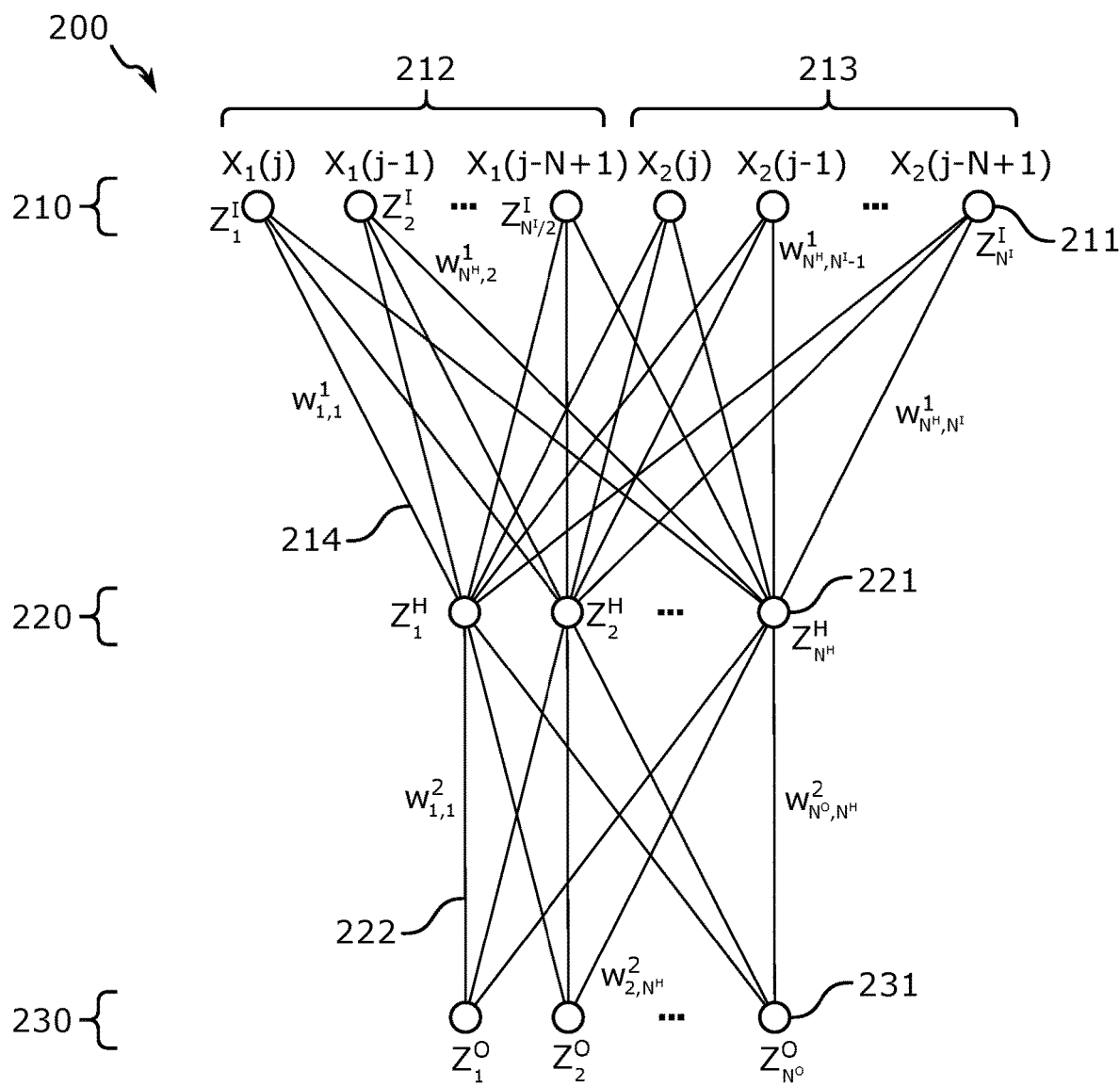
FIG. 2 schematically illustrate an embodiment of an implementation of a machine learning module according to the present disclosure.

With reference to FIG. 2, an example embodiment of the machine learning module 120 as envisaged herein will now be described in more detail, using an ANN in form of an MLP as a suitable example machine learning algorithm.

FIG. 2 schematically illustrates an ANN in form of an MLP 200, as an example of an embodiment of a machine learning algorithm implemented by the machine learning module 120. In this particular example, the MLP 200 is configured having an input layer 210, a hidden layer 220, and an output layer 230. At each time instance $t_1$, the input signal to the MLP 200 is a signal formed by the last N samples of each one of the injector duty cycle $X_1$ and the pump duty cycle $X_2$, i.e.

$$x_j = [X_1(j), X_1(j-1), \ldots, X_1(j-N+1), X_2(j), X_2(j-1), \ldots, X_2(j-N+1)],$$

where, as earlier described herein, $X_1(j) = (t=t_j)$ for example corresponds to a particular sample of the signal $X_1$ taken at the time instance $t_j$. By using the latest N samples of each duty cycle, it can be said that the size of the time window used is N. The input layer includes a total of $N^I = 2N$ input neurons 211, divided into a first group 212 of N input neurons and a second group 213 also of N input neurons. The first group 212 of input neurons receives the first N samples $[X_1(j), \ldots, X_1(j-N+1)]$ of the input signal $x_j$, while the second group 213 of input neurons receives the remaining N samples $[X_2(i), \ldots, X_2(j-N+1)]$ of the input signal $x_j$. The output $Z_i^I$ of each i:th input neuron 211 is the same as its input, i.e. $Z_i^I = x_j(i)$, where $x_j(i)$ is the i:th element of the vector $x_j$.

The hidden layer 220 includes a total of $N^H$ hidden neurons 221. The input layer 210 and the hidden layer 220 are fully connected, i.e. such that each input neuron 211 forms connections 214 to each one of the hidden neurons 221. Each such connection between a particular i:th input neuron 221 and a corresponding h:th hidden neuron 221 is is denoted $w_{i,h}^1$, and corresponds to a particular weight for that connection.

The output $Z_h^H$ from each h:th hidden neuron 221 can be written as $$Z_h^H = \sigma^H(\Sigma_{i=1}^{N^I} w_{h,i}^1 Z_i^I + b^H),$$

where $\sigma^H$ is a (non-linear) activation function used in the hidden neurons 221, and where $b^H$ is a bias term. For the hidden neurons 221, the activation function $\sigma^H$ may for example be a Rectified Linear Unit (ReLU) of the form $$\sigma^H(x) = \max(0, x).$$

The output layer 230 includes a total of $N^O$ output neurons 231. The output neurons 231 are fully connected with the hidden neurons 221, such that each hidden neuron 221 forms connections 222 to each one of the output neurons 231. Each such connection between a particular h:th hidden neuron 221 and a corresponding o:th output neuron 231 is denoted $w_{h,o}^2$, and corresponds to a particular weight for that connection.

The output $Z_o^O$ from each o:th output neuron 231 can be written as $$Z_o^O = \sigma^O(\Sigma_{h=1}^{N^H} w_{o,h}^2 Z_h^H + b^O),$$

where $\sigma^O$ is a (non-linear) activation function used in the output neurons 231, and where $b^O$ is a bias term. For the output neurons 231, the activation function $\sigma^O$ may for example be a Sigmoid function of the form $$\sigma^o(x) = \frac{1}{1+e^{-x}}.$$

If using classifiers as output, each output $Z_o^O$ may e.g. correspond to a respective classifier $Y_o$. As envisaged herein, such a classifier $Y_o$ may correspond to an estimated probability $P_o$ of the injector belong to the o:th class (e.g. $P_{clog}$, $P_{good}$, etc.).

The MLP 200 can be trained using commonly known backward propagation methods, using e.g. a gradient descent-based Adam optimizer, and a mean squared error (MSE) as the error function. It is also envisaged that there may also be more than a single hidden layer, for example two hidden layers, three hidden layers or more, each including $N^{H_k}$ hidden neurons, where k is the number of the hidden layer.

Generation of Training Data

On exemplary way of obtaining data suitable to train the machine learning module 120 as envisaged herein will now be described in more detail.

The topology of the MLP 200 illustrated in FIG. 2 was selected such that there where $N^I=20$ input neurons 211, $N^H=5$ hidden neurons 221, and $N^O=2$ output neurons 231. Thus, the MLP 200 was configured to use a time window of 10 samples for each input duty cycle signal $X_1$ and $X_2$, and a total of two classes (corresponding to "clogged" and "not clogged"/"good").

A laboratory engine rig setup for urea dosage testing was used, wherein the (diesel) engine could be run using both a known clogged injector and a known non-clogged injector in the exhaust system. For each type of injector, the engine was run for a total of five World Harmonized Transient Cycles (WHTC) and a total of one In-Service Conformity Cycle (ISC). While running, data was recorded using a constant sampling rate of 100 milliseconds (ms), i.e. such that the time instances of the sampling was defined as $t_j=t_0+j*0.1$ s, where $t_0$ was the starting time of the signal sampling. From the recorded data, two signals were extracted: the injector control duty cycle $X_1$ and the pump control duty cycle $X_2$. These two signals were extracted while requiring that the urea dosing system was running under normal operation conditions (i.e. a running state), and the mass flow of urea requested from the emission strategy was at least above a predefined threshold. The predefined threshold was, in this particular example, 0.5 grams per second (g/s). The sampled data was then concatenated to form a two-dimensional matrix $\hat{D}$, wherein each row $\hat{D}_i$ of said matrix was defined as $$\hat{D}_i = [X_1(i), X_1(i-1), \ldots, X_1(i-N+1), X_2(i), X_2(i-1), \ldots, X_2(i-N+1), Y_1(i), Y_2(i)],$$

where the additional columns $Y_1$ and $Y_2$ corresponds to the actual class of the injector at time sample/instance i. For example, if it was known that the injector was not clogged at time instance i, $Y_1(i)$ was set to "0" and $Y_2(i)$ was set to "1". Similarly, if it was known that the injector was clogged at another time instance j, $Y_1(j)$ was set to "1" and $Y_2(j)$ was set to "0". After having inserted all rows corresponding to the non-clogged injector followed by all rows corresponding to the clogged injector, the rows of the matrix $\hat{D}$ was then reshuffled into a new matrix $\tilde{D}$. The shuffling was of course such that it preserved the integrity of each time window and associated class, i.e. the order of the columns was not affected.

Connecting back to the description of the input data to the MLP 200 illustrated in FIG. 2, each input vector $x_j$ would thus correspond to the first 20 columns of the j:th line $\tilde{D}_j$ of the matrix $\tilde{D}_j$, while the remaining two columns of the j:th line would correspond to the "correct" probabilities for the respective classes $Y_1$ and $Y_2$ at the j:th time instance. It should be added that as the matrix $\tilde{D}$ has been reshuffled, the j:th line does not correspond to the actual recorded samples during the time interval $t_0+j*0.1$ s to $t_0+(j+9)*0.1$ s. Instead, the j:th line in the matrix $\tilde{D}$ correspond to another time interval $t_0+j'*0.1$ s to $t_0+(j'+9)*0.1$ s of the originally sampled signals $X_1$ and $X_2$, where the mapping from j to j' is random.

After constructing the matrix T), the first X % of the rows were selected as a training set, the next Y % of the rows were selected as a validation set, and the remaining Z % of the rows were selected as a test set. Here, X+Y+Z=100%, and in the particular example described it was decided such that X=60%, Y=20% and Z=20%. In addition, all values relating to the duty cycles $X_1$ and $X_2$ were normalized by dividing by 100, resulting in values between 0.0 and 1.0.

Verification of the Envisaged Machine Learning Module 120

Using the training set as gathered according to the above, the MLP 200 was then trained by updating the weights $w_{h,i}^1$ and $w_{o,h}^2$ using backpropagation and a gradient descent-based Adam optimizer with a learning rate of 0.001. The total number of samples in the training set was 288219, and the batch used (i.e. the number of samples used for accumulating error until the first weight update in the MLP occurs) was 32. The error function was MSE and the whole training set was used for 30 times (epochs). After epoch 30, it was confirmed that the model loss had stabilized at a low enough number, and the validation set was then used to confirm that no overfitting of the model had occurred. At each step, the MSE was calculated using the recently estimated values of $P_1(i)$ and $P_2(i)$, as well as the "correct" answers found in the last two columns of each row $\tilde{D}_i$.

The remaining test data set (i.e. the last 20% of the rows of the matrix $\tilde{D}$) was then used to check the performance of the model. The performance criteria used was a simple average precision (AP), defined as $$AP = \frac{TP}{TP+FP},$$

where TP is the ratio of true positive classifications, and FP the ratio of false positive classifications. A performance of AP=0.927 was determined (following from TP=0.4721 and FP=0.0372). The determined ratio of true negative classifications was TN=0.4721 and the ratio of false negative classifications was FN=0.0186. With the AP as high as ~93%, it was thus concluded that the performance of the envisaged method was satisfactory, and that it to a high degree of certainty had learned to estimate reasonable probabilities for the injector being clogged or not clogged.

Verification of the Envisaged Decision Module 130 and Method 100

Using a method 100 as illustrated in FIG. 1G, additional tests were performed in the engine test rig, but also on data gathered from an actual vehicle (a truck) in which a real, natural clogging of the injector occurred and for which data was available both before, during and after the clogging event.

Figure 3A:
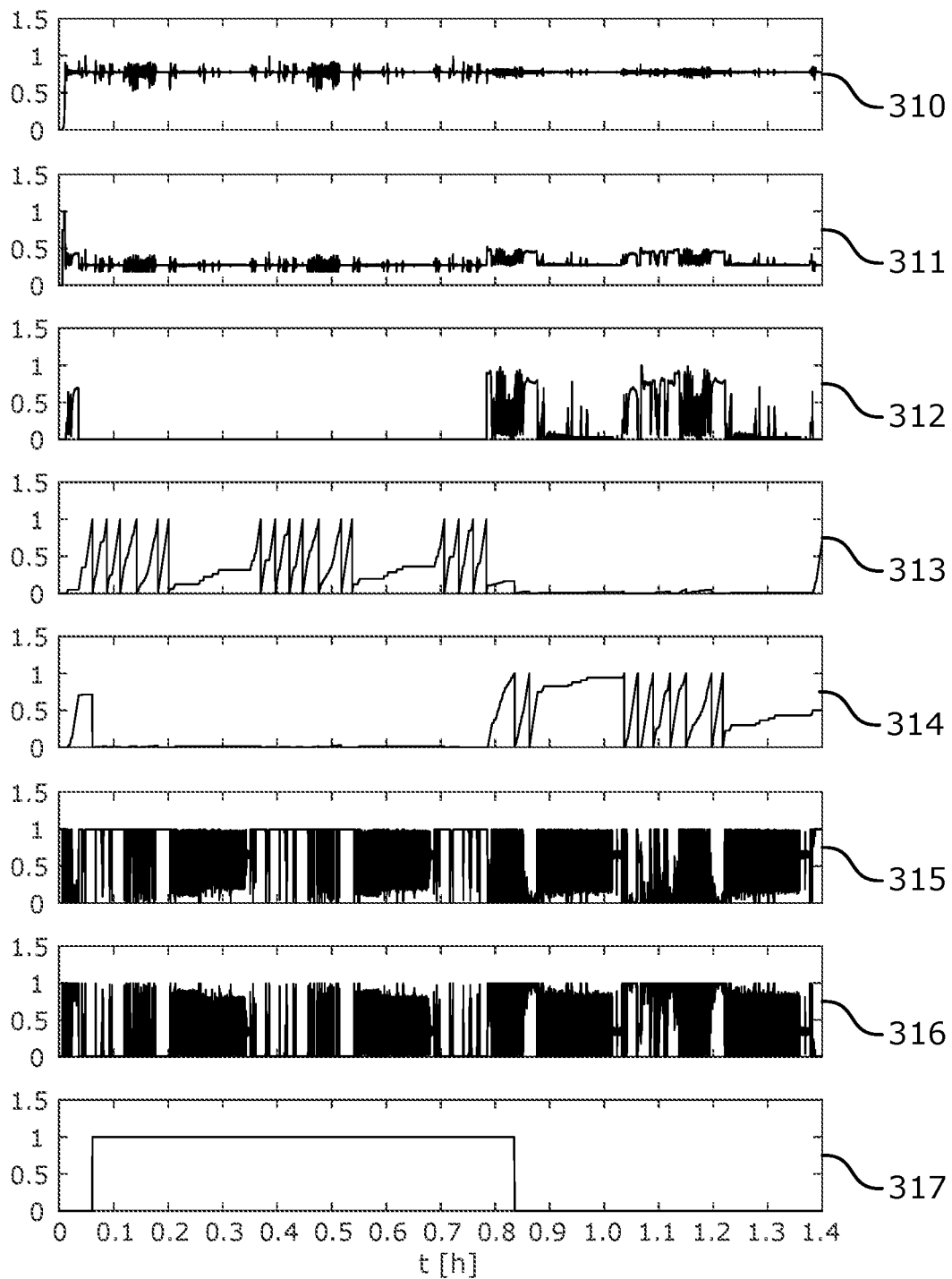
FIGS. 3A-3C schematically illustrate data from various test runs performed to verify the function of methods of the present disclosure.

FIG. 3A illustrates the outcome of a first test performed in the engine test rig. In order to "simulate" a failure of the injector, software modifications was used to stop the injector and trick the monitor into believing that the injector had failed. The graph 310 shows the urea pressure as detected by a sensor in/at the injector, as recorded over a time interval between 0 and 1.4 hours. The graph 311 shows the pump duty cycle $X_2$, and the graph 312 shows the injector duty cycle $X_1$. The graph 313 shows the voting count $C_{count}$ for the "clogged" state, and the graph 314 shows the voting count $C_{good}$ for the "non-clogged" state. The graph 315 shows the estimated probability $P_{clog}$ of the injector being clogged, as output by the machine learning module 120, while the graph 316 shows the estimated probability $P_{good}$ of the injector not being clogged, as also output by the machine learning module 120. Finally, the conclusion drawn by the method 100, i.e. the indication I, is shown in graph 317. The duty cycle values $X_1$ and $X_2$ are normalized to the interval [0,1], while the respective voting counts $C_{clog}$ and $C_{good}$ are normalized by dividing by the corresponding voting thresholds $CT_{clog}$ and $CT_{good}$, respectively. For the binary indication I, "0" means "not clogged", while "1" means "clogged".

As can be seen from FIG. 3A, the software "bypass" was used to stop the injector at around 2-3 minutes into the test run, as shown in e.g. the graph 312. As can also be seen from graph 317, the method correctly detects the clogging of the injector almost immediately, by changing its state from "0" to "1".

Figure 3B:
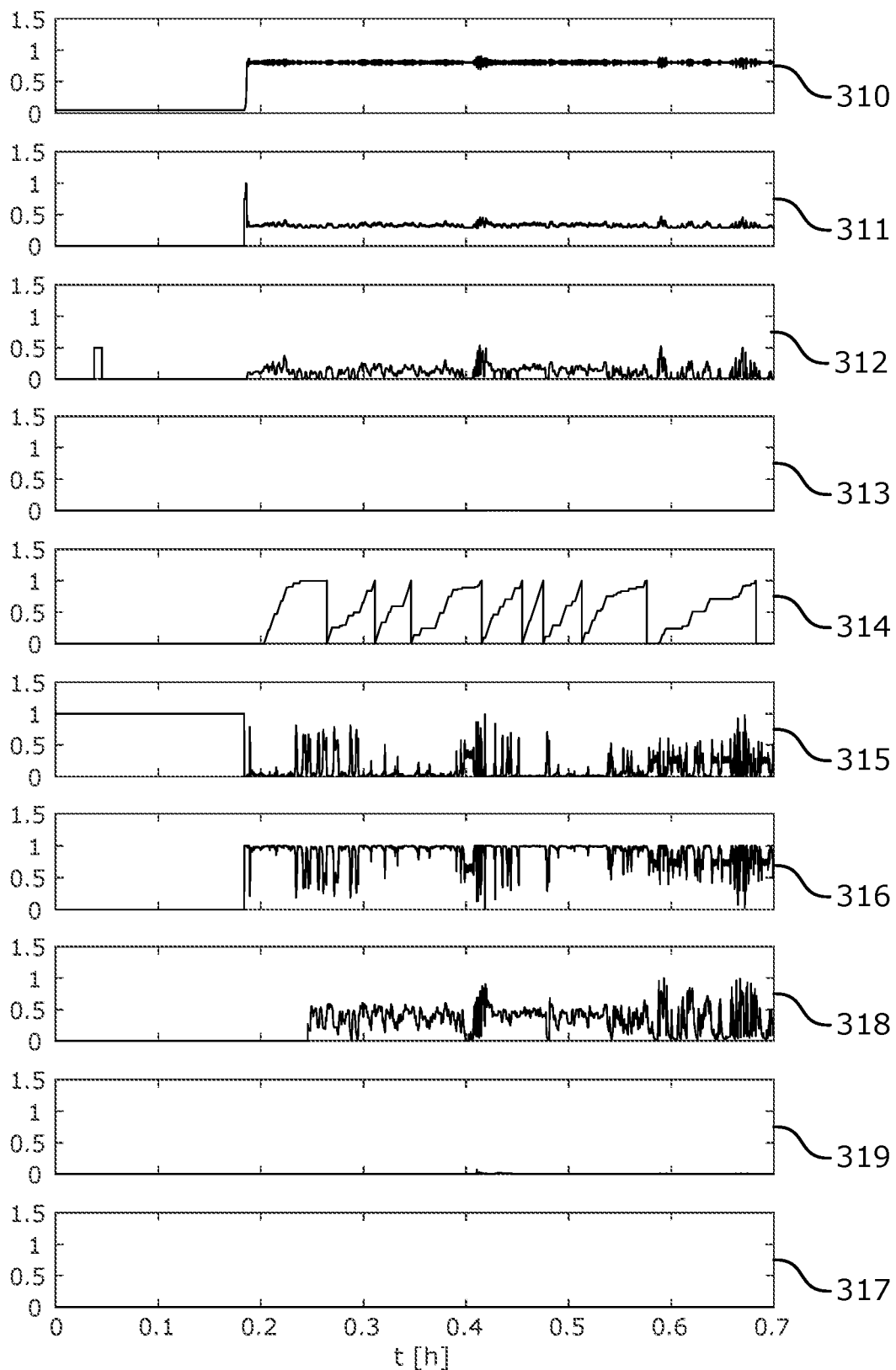
Figure 3C:
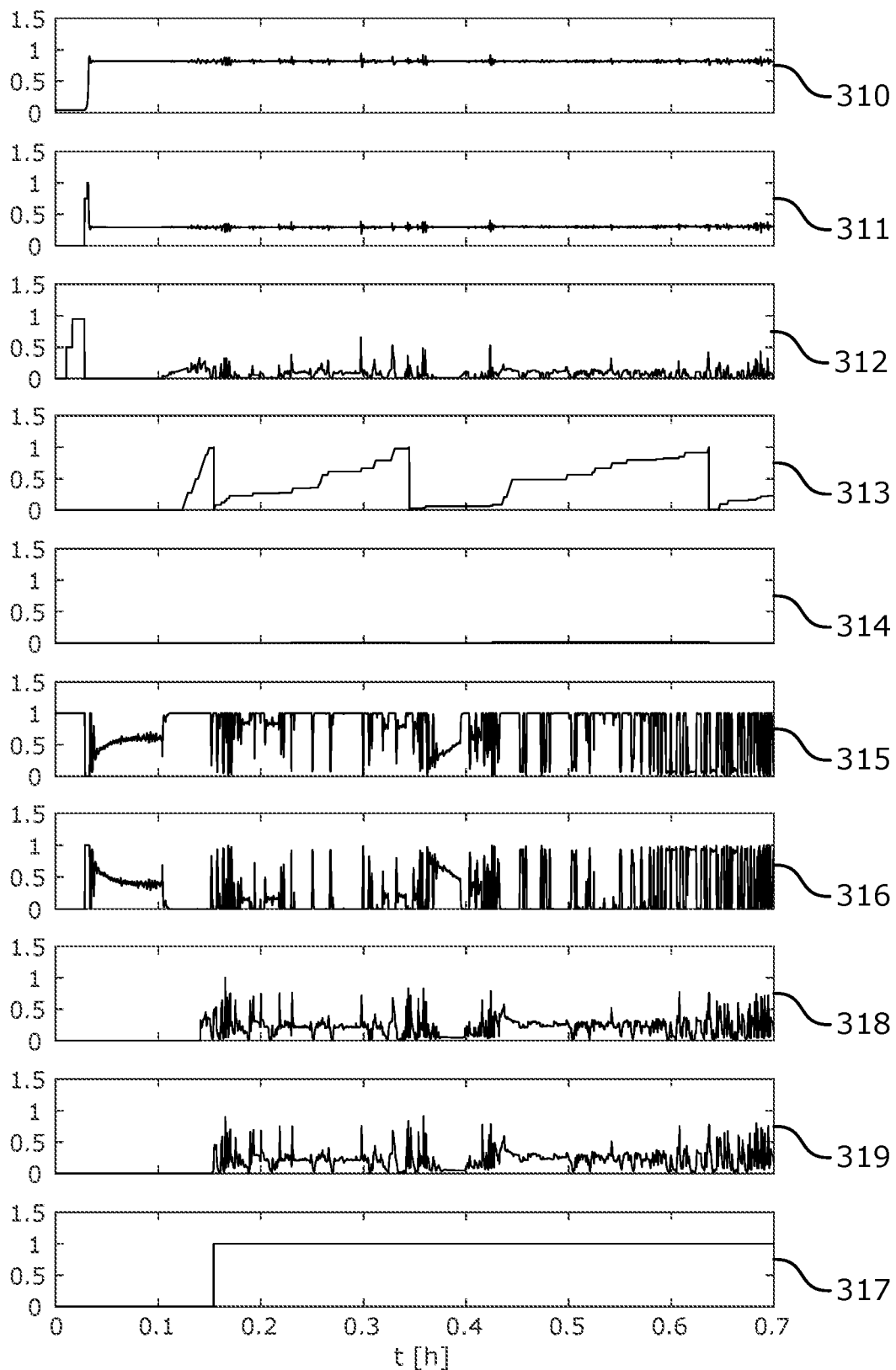

FIGS. 3B and 3C illustrate the outcome of a measurement performed in a real vehicle (a truck), during which measurement the injector happened to clog naturally. FIG. 3A shows the part of the measurement before the clogging occurred, while FIG. 3B shows the part of the measurement including the occurrence of the clogging of the injector. In both FIGS. 3A and 3B, the measurement time shown is from o to 0.7 hours. The numbering of the various graphs are the same as in FIG. 3A. In both FIGS. 3B and 3C, the graphs 310 are the urea pressure. The graphs 311 and 312 are the pump duty cycles $X_2$ and injector duty cycles $X_1$, respectively. The graphs 313 and 314 are the voting counts $C_{clog}$ and $C_{good}$, respectively. The graphs 315 and 316 are the estimated probabilities $P_{clog}$ and $P_{good}$, respectively. The graphs 317 are the indications I. FIGS. 3B and 3C also include two additional graphs, namely the graphs 318 showing the normalized amount of NOx entering the exhaust system of the vehicle, and the graphs 319 showing the normalized amount of NOx exiting the exhaust system of the vehicle. Due to the sensors for the NOx input/output only being able to start measuring after the exhaust muffler has reached a certain temperature, it should be noted that no measurement data for the NOx input/output is provided during the first ~15 minutes of the test runs. The normalizations of the graphs 310-317 are the same as for those in FIG. 3A. By studying the difference between graphs 318 and 319, it can be seen whether the injector is working as it should or not. If the amount of outgoing NOx is low, the exhaust system and the injector is working, and it can be known that the injector is not clogged. However, with a failed (clogged) injector, the outgoing NOx is similar to the ingoing NOx, indicating that there is no elimination of NOx achieved in the exhaust system.

As can be seen in FIG. 3B, the amount of outgoing NOx as shown in graph 319 is approximately zero, and the indication I of graph 317 shows that the method 100 correctly draws the conclusion that the injector is not clogged, as I remains "0" over the whole time interval shown.

As can be seen in FIG. 3C, the injector starts clogging somewhere around 9-10 minutes into the test run, as the outgoing NOx shown in graph 319 then starts to increase. As can also be seen in FIG. 3C, the method 100 correctly, and quickly, starts to indicate that the injector has clogged at around the same time. Thus, also in this real-world example, the method 100 as envisaged herein and explained e.g. with reference to FIG. 1G correctly identifies the clogging of the injector.

In summary of FIGS. 3A-C, it is concluded that the method 100 as envisaged herein sufficiently manages to correctly identify the clogging of the injector, as shown by measurements performed in both lab and real-world environments. In particular, as the only signals used are the injector and pump duty cycles $X_1$ and $X_2$, and as these signals are readily available from e.g. the control system for the injector during its normal operation, the method 100 as envisaged herein works in a non-invasive way without interfering with the normal operation of the injector, and also without requiring any certain other conditions to be fulfilled before the state of the injector can be detected.

Other Aspects

Figure 4:
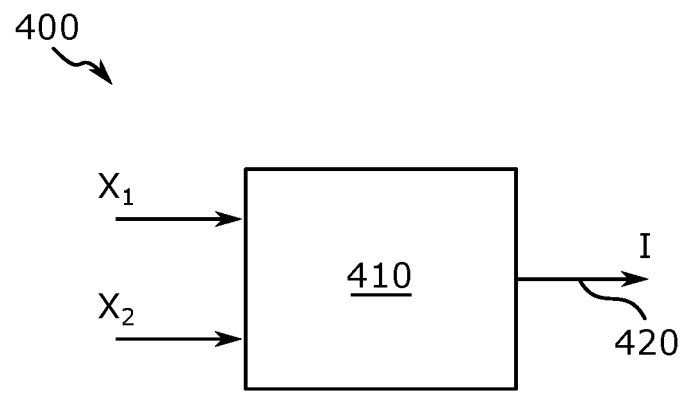
FIG. 4 schematically illustrates an embodiment of a device according to the present disclosure, and FIG. 5 schematically illustrates embodiments of a reductant (e.g. urea) injection system, an exhaust system and a combustion engine according to the present disclosure.

FIG. 4 schematically illustrates an embodiment of a device 400 for determining whether a reductant (e.g urea) injector is clogged as also envisaged herein. The device 400 includes processing circuitry 410. The processing circuitry 410 is configured to receive data signals $X_1$ and $X_2$, corresponding to the injector duty cycle and pump duty cycle as already discussed above. The processing circuitry 410 is further configured to generate an indication I which shows whether the injector is clogged, and for this purpose the processing circuitry 410 implements a method 100 as discussed herein. The indication I is included in a signal 420 output from the processing circuitry 410.

As used herein, "processing circuitry" may for example include any integrated circuit capable of performing instructions stored e.g. as machine language instructions in some memory to which the processor has access, or where the memory is included as part of the processing circuitry itself. Examples of processing circuitry may for example include, but are not limited to, central processing units (CPUs), graphics processing units (GPUs), field-programmable gate-arrays (FPGAs), etc. The processing circuitry may be provided as part of e.g. a computer, an engine control unit, an after-treatment control module (ACM), or similar.

It is also envisaged to provide a computer program for determining whether the injector is clogged. The computer program includes computer code which, when run on processing circuitry such as the processing circuitry 410 of the device 400 illustrated in FIG. 4, causes the device 400 to receive the data $X_1$ and $X_2$, to generate the indication I using any method 100 envisaged herein, and to output the signal 420 including the indication I.

As used herein, the envisaged computer program may e.g. be stored or distributed on a data carrier. A "data carrier" may e.g. be a transitory data carrier, such as a modulated electromagnetic wave or a modulated optical wave. A data carrier may also be non-transitory, including e.g. volatile and non-volatile memories such as permanent or non-permanent storage media of magnetic, optical or solid-state type. Such memories may be portable (as found e.g. in/on USB-sticks, CD-roms, DVDs, etc.), or fixedly mounted (such as e.g. HDDs, SSDs, etc.).

Figure 5:
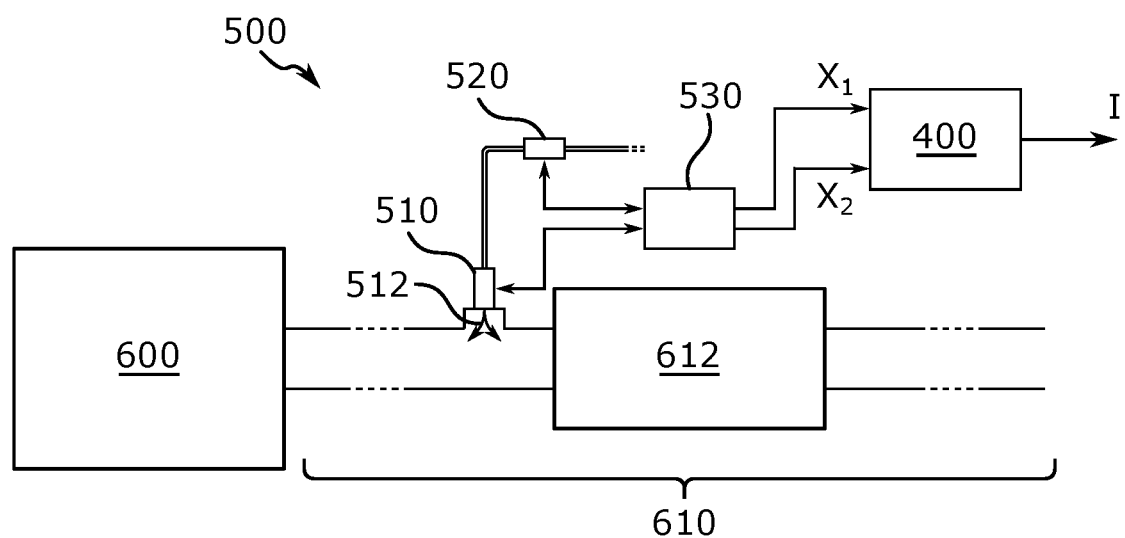

FIG. 5 schematically illustrates an embodiment of a reductant (e.g. urea) injection system 500 for a combustion engine 600, as envisaged herein. The system 500 includes a urea injector 510, which is configured to inject urea into an exhaust system 610 of the engine 600. The exhaust system 610 may for example include a catalyst 612, and it is envisaged that the urea injector 510 may be arranged to inject a spray of urea 512 (or e.g. a urea/water mixture) upstream of the catalyst 612, as illustrated in FIG. 5. The system 500 further includes a pump 520, which is configured to provide the urea to the injector 510, preferably from a tank (not shown) or similar in which the urea (or mix thereof) can be stored. The system 500 further includes a control unit 530 configured to control both the injector duty cycle $X_1$ and the pump duty cycle $X_2$ for the injector 510, in order to operate the injector 510 and pump 520 according to a particular emission control strategy. For this purpose, there may of course also be provided additional sensors (not illustrated) for measuring various properties of e.g. the exhaust gases in the exhaust system 610, and/or for measuring various properties of e.g. the engine 600 itself. Finally, the system 500 also includes the device 400 as described with reference to FIG. 4. The device 400 is used to determine, during running of the engine 600, whether the injector 510 is clogged. As described earlier herein, for this purpose, the device 400 receives (a copy of) the injector and pump duty cycles $X_1$ and $X_2$, respectively, from the control unit 530. In some embodiments of the system 500, it is envisaged that the device 400 is implemented as part of the control unit 530, or that the control unit 530 is implemented as part of the device 400. The device 400 outputs the indication I, which may for example be used to light up a warning-lamp within a vehicle, to sound an audible alarm, or to e.g. send a remote message containing the indication to e.g. a service center or similar, if it is determined that the injector is clogged. As discussed earlier herein, this may help to notice that the injector is clogged, such that the injector can be replaced and/or repaired without further delay. In some embodiments, it is envisaged that it may even be so that if the indication I indicates that the injector is clogged, it may be enforced using e.g. software that the combustion engine will not (re-)start before the injector has been repaired/replaced.

Envisaged herein is also an aspect including the engine 600, and also including e.g. the exhaust system 610 and in particular including the reductant (e.g. urea) injection system 500. Although not illustrated in any particular Figure herein, as vehicle including the engine 600 (and the exhaust system 610 and urea injection system 500) is also envisaged as another aspect of the present disclosure. Another aspect of the present disclosure includes only the exhaust system 610 and the reductant/urea injection system 500.

As envisaged herein, a "combustion engine" (or Internal Combustion Engine, ICE) is not necessarily a diesel-driven engine. A combustion engine may for example, in some envisaged embodiments, instead be e.g. a spark-ignition (SI) combustion engine. Such a combustion engine may for example be driven by hydrogen. Likewise, as envisaged herein, the combustion engine can be used to propel numerous different types of vehicles, including e.g. trucks, busses, cars, working machines, and similar. The combustion engine may also form part of e.g. a marine vessel, or any other type of vessel wherein propulsion is provided by combustion engines. It is also envisaged that the combustion engine may also be used to drive something which is not a vehicle itself, such as for example a (stationary) generator or similar. In particular, it is envisaged that the proposed method (and device) for detecting whether a reductant injector is clogged can also be applied to other types of injectors, in particular any kind of injector configured to be driven using a duty cycle (e.g. based on pulse-width modulation, PWM, or similar), and configured to inject any kind of pressurized non-compressible fluid. Such other injectors may for example be diesel injectors forming part of engine diesel injection systems, or for example Aftertreatment Hydrocarbon Injectors (AHIs) used to e.g. inject diesel at a muffle to help increase temperatures to higher levels for regeneration.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A computer-implemented method for determining whether a reductant injector is clogged, comprising:
    receiving data indicative of at least i) an injector duty cycle for the reductant injector and ii) a pump duty cycle for a pump providing reductant to the reductant injector;
    providing the data as input one or more machine learning algorithms trained to, based on the data indicative of the injector duty cycle and the pump duty cycle, infer a set of one or more statistics including at least a first value indicative of a probability of the reductant injector being clogged, and
    providing, based on the one or more statistics, an indication of whether the reductant injector is clogged.

2. The method according to claim 1, wherein:
    the one or more machine learning algorithms are at least partially implemented using an artificial neural network, ANN, including at least an input layer, a hidden layer connected to the input layer, and an output layer connected to the hidden layer, and
    the hidden layer or the output layer includes at least one neuron for providing the first value.

3. The method according to claim 2, wherein:
    the input layer includes at least 2N input neurons,
    a first set of N input neurons are configured to receive values indicative of the injector duty cycle sampled across a first time window of N different first time instances, and
    a second set of N input neurons are configured to receive values indicative of the pump duty cycle sampled across a second time window of N different second time instances.

4. The method according to claim 3, wherein:
    the first time window equals the second time window, and all of the first time instances and the second time instances are separated by a same time difference (dt).

5. The method according to claim 1, wherein:
providing the indication that the reductant injector is clogged includes confirming a fulfilment of a full set of one or more conditions, and
the one or more conditions include a first condition that, for at least one time instance, the first value, or a value of a first function applied to the first value, is at least not below a first threshold.

6. The method according to claim 5, wherein:
the one or more statistics further include a second value indicative of a probability of the reductant injector not being clogged, and
the one or more conditions further include a second condition that, for the at least one time instance, the second value, or a value of a second function applied to the second value, is at least not above a second threshold.

7. The method according to claim 5, wherein:
the one or more conditions further include a third condition that, during at least a first time period preceding, or preceding and also including the at least one time instance, a requested mass flow, and/or a time average of a requested mass flow, for the reductant injector has at least not been below a mass flow threshold.

8. The method according to claim 5, wherein:
the one or more conditions further include a fourth condition that, during at least a second time period preceding, or preceding and also including the at least one time instance, a count of time instances at which all of the other of the one or more conditions have been fulfilled is at least not below a first voting threshold, and
the second time period at most extends back to a time instance at which the fourth condition was last fulfilled.

9. The method according to claim 8, wherein:
the second time period at most extends back to a most recent of the time instance at which the fourth condition was last fulfilled and a time instance at which a count of time instances at which all of said other of the one or more conditions have not been fulfilled was last at least not below a second voting threshold.

10. The method according to claim 5, wherein:
the one or more conditions further include a fifth condition that, a second count that is increased at each time instance at which all of the other of the one or more conditions have been fulfilled, and decreased at each time instance at which all of the other of the one or more conditions have not been fulfilled, is at least not below a third voting threshold.

11. The method according to claim 1, wherein:
the one or more statistics further includes at least one additional value indicative of a probability of the reductant injector being only partially clogged.

12. A device for determining whether a reductant injector is clogged, comprising processing circuitry configured to cause the device to:
receive data indicative of at least i) an injector duty cycle for the reductant injector and ii) a pump duty cycle for a pump providing reductant to the reductant injector;
generate an indication of whether the reductant injector is clogged by performing a method according to claim 1, and
output a signal including the indication.

13. A computer program for determining whether a reductant injector is clogged, the computer program comprising computer code which, when run on processing circuitry of a device, causes the device to:
receive data indicative of at least i) an injector duty cycle for the reductant injector and ii) a pump duty cycle for a pump providing reductant to the reductant injector;
generate an indication of whether the reductant injector is clogged by performing a method according to claim 1, and
output a signal including the indication.

14. A reductant injection system for a combustion engine, comprising:
a reductant injector configured to inject reductant into an exhaust system of the engine;
a pump configured to provide reductant to the reductant injector; a control unit configured to control an injector duty cycle for the reductant injector and a pump duty cycle for the pump, and
a device for determining whether the reductant injector is clogged according to claim 13.

15. A combustion engine, comprising a reductant injection system according to claim 14.

* * * * *